United States Patent
Viot

(10) Patent No.: US 9,932,467 B2
(45) Date of Patent: Apr. 3, 2018

(54) METHOD FOR MANUFACTURING A POLYPROPYLENE COMPOSITION WITH CONTROLLED FLUIDITY

(71) Applicant: Compagnie Plastic Omnium, Lyons (FR)

(72) Inventor: Frederic Viot, Poncin (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 15/108,820

(22) PCT Filed: Dec. 22, 2014

(86) PCT No.: PCT/FR2014/053499
§ 371 (c)(1),
(2) Date: Jun. 29, 2016

(87) PCT Pub. No.: WO2015/101734
PCT Pub. Date: Jul. 9, 2015

(65) Prior Publication Data
US 2016/0326356 A1 Nov. 10, 2016

(30) Foreign Application Priority Data
Dec. 30, 2013 (FR) .................... 13 63675

(51) Int. Cl.
*C08L 23/12* (2006.01)
*B29C 47/00* (2006.01)
(Continued)

(52) U.S. Cl.
CPC .......... *C08L 23/12* (2013.01); *B29C 47/0004* (2013.01); *C08J 3/005* (2013.01); *C08J 3/12* (2013.01); *B29C 47/0009* (2013.01); *B29K 2023/12* (2013.01); *B29K 2023/14* (2013.01); *B29K 2096/02* (2013.01); *B29K 2105/0094* (2013.01); *B29K 2105/26* (2013.01);
(Continued)

(58) Field of Classification Search
CPC ............................ C08L 23/12; B29C 47/0004
See application file for complete search history.

(56) References Cited

U.S. PATENT DOCUMENTS 8,309,659 B2 * 11/2012 Masarati ................ C08L 23/10
264/328.1
2010/0048807 A1 2/2010 Masarati et al.
2013/0101771 A1 * 4/2013 Masarati ................ B82Y 30/00
428/36.4

FOREIGN PATENT DOCUMENTS

CN 101568576 A 10/2009
CN 102958997 A 3/2013
(Continued)

OTHER PUBLICATIONS

International Search Report PCT/ISA/210 for International Application No. PCT/FR2014/053499 dated Mar. 3, 2015.
(Continued)

*Primary Examiner* — Vu A Nguyen
(74) *Attorney, Agent, or Firm* — Harness, Dickey & Pierce, P.L.C.

(57) ABSTRACT

The method for manufacturing a composition consists in bringing into contact a product containing mostly polypropylene having a controlled fluidity less than 10 g/10 min with highly fluid polypropylene and a polymer grafted with maleic anhydride.

8 Claims, 2 Drawing Sheets

(51) Int. Cl.
  *C08J 3/00*    (2006.01)
  *C08J 3/12*    (2006.01)
  *B29K 105/00*  (2006.01)
  *B29K 23/00*   (2006.01)
  *B29K 96/02*   (2006.01)
  *B29K 105/26*  (2006.01)
  *B29L 31/30*   (2006.01)

(52) U.S. Cl.
  CPC ... *B29L 2031/3005* (2013.01); *C08J 2323/12* (2013.01); *C08J 2423/12* (2013.01); *C08J 2425/08* (2013.01); *C08J 2425/10* (2013.01); *C08J 2451/00* (2013.01)

(56) References Cited

FOREIGN PATENT DOCUMENTS

| | | |
|---|---|---|
| FR | 2984894 A1 | 6/2013 |
| WO | WO-2012000783 A1 | 1/2012 |
| WO | WO-2013093364 A1 | 6/2013 |

OTHER PUBLICATIONS

Written Opinion of the International Searching Authority PCT/ISA/237 for International Application No. PCT/FR2014/053499 dated Mar. 3, 2015.
French Search Report and Written Opinion for French Application No. FR 1363675 dated Jul. 23, 2014.
Chinese Office Action dated Jan. 19, 2018 for corresponding Chinese Patent Application No. 201480076504.X.

\* cited by examiner

METHOD FOR MANUFACTURING A POLYPROPYLENE COMPOSITION WITH CONTROLLED FLUIDITY

CROSS-REFERENCE TO RELATED APPLICATIONS

This application is the U.S. National Phase application of PCT Application No. PCT/FR2014/053499 filed on Dec. 22, 2014, which claims priority to French Patent Application No. 1363675 filed on Dec. 30, 2013, the contents of each of which are incorporated herein by reference.

This invention relates to compositions comprising plastics, especially thermoplastics. It applies in particular to compositions for manufacturing automotive parts.

To reduce $CO_2$ emissions of vehicles, it is important to reduce their weight. One of the measures used is to reduce the thickness of some parts, in particular body parts.

To obtain a very long and very wide but thin part, it is preferable to control the fluidity of the composition. In this context, the need for a polypropylene with increasingly high fluidity emerged (greater than 12 g/10 min, standard ISO 1133 [230° C., 2.16 kg]). Currently, in order to increase the fluidity of a composition comprising polypropylene, an oxidant is added at the start of the extrusion method to chemically degrade the polypropylene and thus reduce the molar mass.

However, when the composition comprises several polyolefins, generally associated with a compatibiliser, addition of the oxidant leads to reactions of various types depending on the nature of the polyolefin. In particular, the radicals resulting from thermal decomposition of the oxidant lead mainly to branching, even crosslinking, of the polyethylene chains. This structural modification of the polyethylene chains degrades the mechanical characteristics of the composition and the surface properties of the plastic part obtained by injecting this composition. In particular, degradation of the surface properties prevents adhesion of paint on the part and accentuates the appearance defects of the painted part.

To solve this problem, a method consisting of interacting in an extruder a first product containing mostly polypropylene with an oxidant and of adding, after mixing the oxidant and the first product, an antioxidant, introduced prior to or at the same time as a second product comprising polyethylene, has already been proposed, in French patent application FR 2 984 894. With this method therefore, the second product comprising the polyethylene is not added at the start of the extrusion, which is possible when the second product comprising the polyethylene is used in small quantities compared with the final composition. However, this method cannot be used to manufacture a composition containing more than 25% by weight of the second product comprising the polyethylene since, in such a large proportion, the product would have to be introduced at the start of the extrusion.

The invention aims to provide an alternative solution that can also be used when the second product containing polyethylene is the majority product.

Another objective of the invention is to propose an alternative solution that can also be used when the second product containing the polyethylene is present in a proportion of more than 25% by weight.

To increase the fluidity of a product comprising polypropylene, the invention consists in adding thereto a second product comprising polypropylene, of higher fluidity. Such mixtures are possible between polypropylenes having similar fluidities. For example, a homogeneous mixture can be obtained from a first product of fluidity 8 g/10 min and a second product of fluidity 12 g/10 min. Mixing equivalent quantities of the two products will lead to a mixture of fluidity 10 g/10 min. However, a homogeneous mixture cannot be obtained if products of very different fluidities are brought into contact. The first product consists in fact of long polypropylene chains compared with the very short chains of the second product. These two chain populations slide over each other without forming a homogeneous mixture.

The invention aims, starting from two products containing polypropylene, one having average fluidity and the other having high fluidity, to manufacture thin parts with good mechanical characteristics and surface properties.

The invention relates to a method for manufacturing a composition, characterised by bringing into contact the following three components:
  a product containing mostly polypropylene having a controlled fluidity according to standard ISO 1133 (230° C., 2.16 kg) less than 10 g/10 min, present in an amount from 82% to 88% inclusive, by total weight of the composition,
  polypropylene having a controlled fluidity according to standard ISO 1133 (230° C., 2.16 kg) greater than 400 g/10 min, present in an amount from 7% to 13% inclusive, by total weight of the composition, and
  a polymer grafted with maleic anhydride, present in an amount from 2% to 8 inclusive, by total weight of the composition.

In the remainder of the document, the expression "highly fluid polypropylene" designates polypropylene having a controlled fluidity according to standard ISO 1133 (230° C., 2.16 kg) greater than 400 g/10 min.

In the method, the grafted polymer is used to make the two populations of short chains and long chains of polypropylene compatible. Thus, starting from two products containing polypropylene and having very different fluidities, a product is obtained having a fluidity of intermediate value compatible with the manufacture of thin parts and having the mechanical characteristics of elongation at break and impact resistance and the required surface properties.

This method can also be used when the product containing mostly polypropylene contains polyethylene.

Optionally, the method comprises two steps, performed in this order:
  bringing into contact the product containing mostly polypropylene and the polypropylene having a controlled fluidity according to standard ISO 1133 (230° C., 2.16 kg) greater than 400 g/10 min, and
  adding the polymer grafted with maleic anhydride.

Preferably, the product containing mostly polypropylene and the polypropylene having a controlled fluidity according to standard ISO 1133 (230° C., 2.16 kg) greater than 400 g/10 min are brought into contact so as to obtain a first mixture and the polymer grafted with maleic anhydride is added in a second stage to this first mixture.

The method can therefore be performed in two separate steps, addition of the polymer grafted with maleic anhydride can be decided later, for the manufacture of parts when they require improved mechanical properties of elongation at break and impact resistance.

Optionally, the polymer grafted with maleic anhydride is Styrene Ethylene Butadiene Styrene (SEBS).

According to a first embodiment, the components are brought into contact in an extruder.

According to a second embodiment, the components are brought into contact in a plasticating screw.

With this method, since all the components used in the composition can be added simultaneously, the products can be mixed at this stage of the part manufacturing process.

Advantageously, the product containing mostly polypropylene contains between 5% and 10% inclusive of polyethylene, by total weight of said product.

Compared with the method described in French patent application FR 2 984 894, this method offers the advantage of being simpler and allowing a greater quantity of material in a given part to be recycled. The polypropylene containing polyethylene can in fact be added at the same time as the other components.

Optionally, the product containing mostly polypropylene is obtained at least partly from recycling.

This product is for example obtained from automobile shredder residue (ASR) or waste electrical and electronic equipment (WEEE). The method according to the invention therefore provides a means of allowing this waste to be reused and obtaining parts with a low cost price.

The invention also relates to a composition, characterised in that it contains at least polypropylene, polyethylene and maleic acid, and in that it has a controlled fluidity according to standard ISO 1133 (230° C., 2.16 kg) greater than or equal to 30 g/10 min.

At the end of the compatibilisation reaction, the maleic anhydride residues remaining in the medium are converted by hydration into maleic acid, which is why the composition resulting from the method contains maleic acid.

This composition having, despite a high fluidity, good mechanical characteristics of elongation at break and impact resistance, can be used to manufacture very long and very wide but thin parts.

Preferably, the composition contains at least 0.2% by total weight of the composition of a polymer grafted with maleic anhydride.

Preferably, the polyethylene and at least some of the polypropylene of the composition are obtained from recycling.

The invention also relates to a motor vehicle part manufactured in the composition described above.

Optionally, the part forms at least some of a body part for motor vehicle.

The part may in particular be a bumper skin, an opening panel (e.g. side door or tailgate) or a wing.

The invention will be better understood on reading the accompanying figures, which are given solely by way of example and not limiting in any way, in which.

Figure 1:
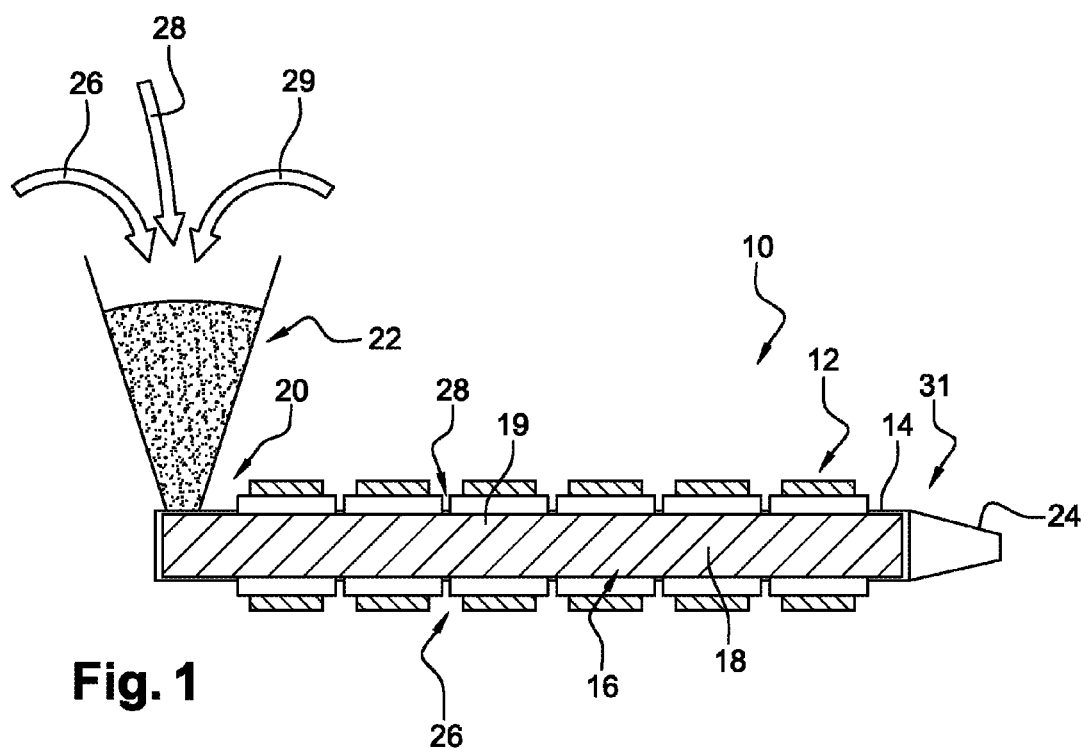
FIG. 1 is a schematic representation of a device according to one embodiment of the invention.

We now refer to FIG. 1. FIG. 1 shows an extrusion device according to one embodiment of the invention and designated by the general reference 10.

The device 10 forms an extruder and comprises a stator 12 forming a barrel 14 and a rotor 16 forming a worm screw system (single or twin screw) 18. The screw 18 can rotate freely in the barrel 14. The barrel 14 and the screw 18 define an annular space 19 in which a composition to be extruded is advancing.

The device 10 comprises an upstream inlet 20 adapted for the introduction of compounds, in this case a product containing mostly polypropylene 26 of a controlled fluidity 9 g/10 min, highly fluid polypropylene 28 and SEBS grafted with maleic anhydride 29. The device 10 comprises a hopper 22 to introduce these compounds in the inlet 20. The device 10 also comprises an outlet 31 provided with an extrusion head 24.

Figure 2:
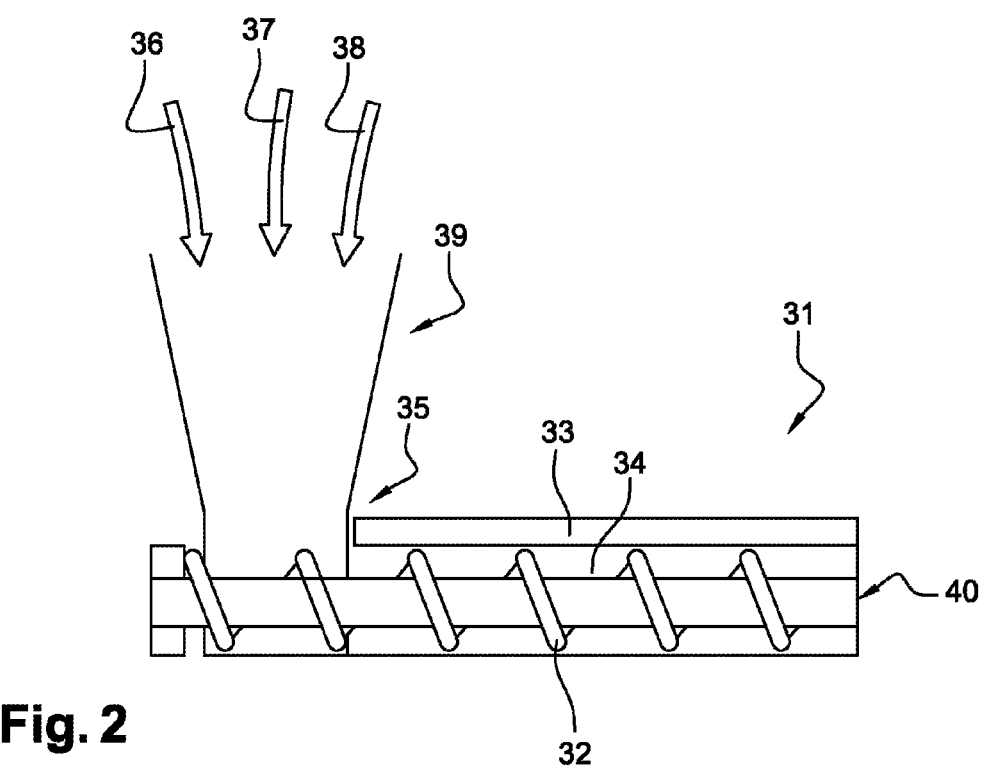
FIG. 2 is a schematic representation of a device according to another embodiment of the invention.

FIG. 2 shows a plasticating screw device according to another embodiment of the invention and designated by the general reference 31.

The device 31 forms an injection plasticating screw and comprises a screw 32 surrounded by a barrel 33. The screw 32 can rotate freely in the barrel 33. The barrel and the screw define an annular space 34 in which a composition to be injected is advancing.

The device 31 comprises an upstream inlet 35 adapted for the introduction of compounds, in this case a product containing mostly polypropylene 36 of a controlled fluidity 9 g/10 min, highly fluid polypropylene 37 and SEBS grafted with maleic anhydride 38. The device 31 comprises a hopper 39 to introduce these compounds in the inlet 35. The device 31 also comprises an outlet 40.

Figure 3:
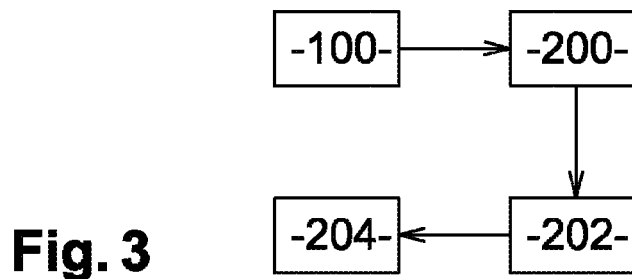
FIG. 3 is a flowchart of a method for manufacturing a part according to one embodiment of the invention.
Figure 4:
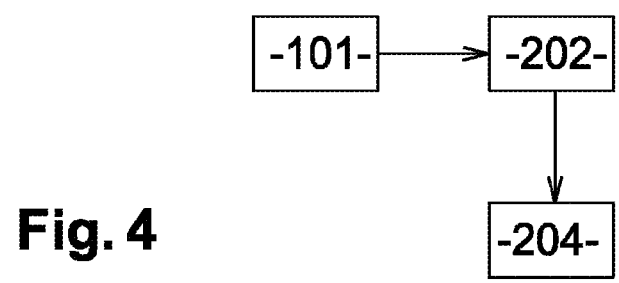
FIG. 4 is a flowchart of a method for manufacturing a part according to another embodiment of the invention.

In FIGS. 3 and 4, identical steps are designated by the same reference numbers.

Figure 5:
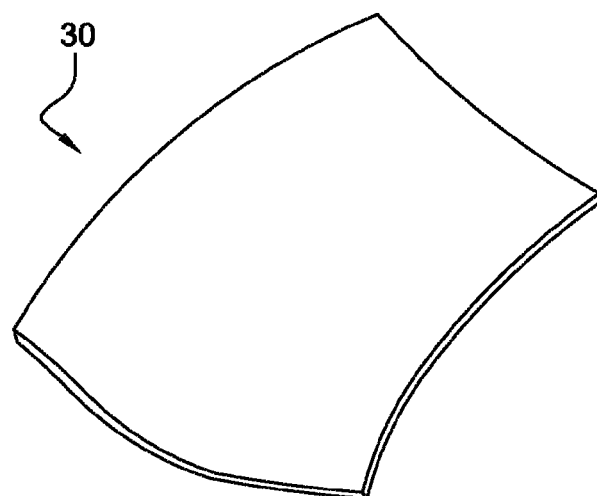
FIG. 5 is a perspective view of a part according to the invention manufactured by implementing the methods illustrated on the figures.

We will now describe one embodiment of the method for manufacturing a part illustrated on FIG. 5 with reference to FIG. 3 schematically illustrating the main steps of this method.

In a step 100, a product containing mostly polypropylene is introduced in an extruder. In this step, a highly fluid polypropylene and a polymer grafted with maleic anhydride are also introduced.

The product containing mostly polypropylene has a controlled fluidity according to standard ISO 1133 (230° C., 2.16 kg) less than 10 g/10 min and is added in an amount from 82% to 88% inclusive, by total weight of the composition. Alternatively, the product contains between 5% and 10% inclusive of polyethylene, by total weight of the product. Optionally, at least some of the product comes from recycling.

The highly fluid polypropylene has a controlled fluidity according to standard ISO 1133 (230° C., 2.16 kg) greater than 400 g/10 min and is added in an amount from 7% to 13% inclusive, by total weight of the composition.

The polymer grafted with maleic anhydride is added in an amount from 2% to 8% inclusive, by total weight of the composition. This polymer is for example SEBS.

In a step 200, the manufactured composition is recovered. Then, in a step 202, the composition is introduced, for example by injection, in a mould and the part 30 is moulded. Lastly, in a step 204, the mould is cooled and the part 30 is extracted. The part 30 may subsequently be surface-treated. In particular, paint may be applied.

Another embodiment of the method for manufacturing a part illustrated on FIG. 5 is described with reference to FIG. 4 schematically illustrating the main steps of this method.

In a step 101, a product containing mostly polypropylene is introduced into a plasticating screw. In this step, a highly fluid polypropylene and a polymer grafted with maleic anhydride are also introduced.

The product containing mostly polypropylene has a controlled fluidity according to standard ISO 1133 (230° C., 2.16 kg) less than 10 g/10 min and is added in an amount from 82% to 88% inclusive, by total weight of the composition. Alternatively, the product contains between 5% and 10% inclusive of polyethylene, by total weight of the product. Optionally, at least some of the product comes from recycling.

The highly fluid polypropylene has a controlled fluidity according to standard ISO 1133 (230° C., 2.16 kg) greater than 400 g/10 min and is added in an amount from 7% to 13% inclusive, by total weight of the composition.

The polymer grafted with maleic anhydride is added in an amount from 2% to 8% inclusive, by total weight of the composition. This polymer is for example SEBS.

In a step 202, the composition is introduced, for example by injection, in a mould and the part 30 is moulded. Lastly, in a step 204, the mould is cooled and the part 30 is extracted. The part 30 may subsequently be surface-treated. In particular, paint may be applied.

Example A of a Sample of a Composition According to the Invention:

A composition was obtained by introducing into an extruder 85% of homopolymer polypropylene of fluidity 9 g/10 min, 10% of highly fluid homopolymer polypropylene and 5% of SEBS grafted with maleic anhydride. The extruded material was then granulated.

A sample of the material so obtained is analysed conventionally by Fourier transform infrared (FTIR) spectroscopy. Briefly, 2 g of pellets of the material to be analysed are pressed at 200° C. to obtain a film about 150 µm thick. The film is then studied by FTIR spectroscopy. The presence of maleic acid is associated with a very strong peak between 1700 and 1800 cm$^{-1}$, which corresponds to detection of the (C=O) functions of the maleic acid present in the sample.

Example B of a Sample of a Control Composition:

A control composition was obtained by introducing into an extruder 87.5% of homopolymer polypropylene of fluidity 9 g/10 min and 12.5% of highly fluid homopolymer polypropylene. The extruded material was then granulated. A sample of material was analysed according to the same protocol as above. The FTIR spectroscopy results do not show a strong peak characteristic of the (C=O) bonds of maleic acid between 1700 and 1800 cm$^{-1}$.

Example C of a Sample of a Composition According to the Invention:

A composition was obtained by introducing in the input silo of an injection press 85% of homopolymer polypropylene of fluidity 9 g/10 min, 10% of highly fluid homopolymer polypropylene and 5% of SEBS grafted with maleic anhydride. After injecting the mixture in a mould, a sample of the shaped material is then analysed according to the same protocol as above. The FTIR spectroscopy results show a strong peak between 1700 and 1800 cm$^{-1}$.

Example D of a Sample of a Control Composition:

A composition was obtained by introducing in the input silo of an injection press 87.5% of homopolymer polypropylene of fluidity 9 g/10 min and 12.5% of highly fluid homopolymer polypropylene. After injecting the mixture in a mould, a sample of the shaped material is analysed according to the same protocol as above. The FTIR spectroscopy results do not show a strong peak characteristic of the (C=O) bonds of maleic acid between 1700 and 1800 cm$^{-1}$.

Example E of a Sample of a Composition According to the Invention:

A composition was obtained by introducing in an extruder 85% of a product containing mostly homopolymer polypropylene and 8% of polyethylene, the product having a fluidity of 9 g/10 min. 10% of highly fluid homopolymer polypropylene were added, as well as 5% of SEBS grafted with maleic anhydride. The extruded material was then granulated. A sample of the material obtained was analysed according to the same protocol as in the preceding examples. The FTIR spectroscopy results show a strong peak between 1700 and 1800 cm$^{-1}$.

Example F of a Sample of a Control Composition:

A composition was obtained by introducing in an extruder 87.5% of a product containing mostly homopolymer polypropylene and 8% of polyethylene, the product having a fluidity of 9 g/10 min. 12.5% of highly fluid homopolymer polypropylene was added. The extruded material was then granulated. A sample of the material obtained was analysed according to the same protocol as above. The FTIR spectroscopy results do not show a strong peak characteristic of the (C=O) bonds of maleic acid between 1700 and 1800 cm$^{-1}$.

Example G of a Sample of a Composition According to the Invention:

A composition was obtained by introducing in the input silo of an injection press 85% of a product containing mostly homopolymer polypropylene and 8% of polyethylene, the product having a fluidity of 9 g/10 min. 10% of highly fluid homopolymer polypropylene and 5% of SEBS grafted with maleic anhydride were added. After injecting the mixture in a mould, a sample of the shaped material is analysed according to the same protocol as above. The FTIR spectroscopy results show a strong peak between 1700 and 1800 cm$^{-1}$.

Example H of a Sample of a Control Composition:

A composition was obtained by introducing in the input silo of an injection press 87.5% of a product containing mostly homopolymer polypropylene and 8% of polyethylene, the product having a fluidity of 9 g/10 min. 12.5% of highly fluid homopolymer polypropylene was added. After injecting the mixture in a mould, a sample of the shaped material is analysed conventionally according to the same protocol as above. The FTIR spectroscopy results do not show a strong peak characteristic of the (C=O) bonds of maleic acid between 1700 and 1800 cm$^{-1}$.

FIG. 5 shows the part 30. The part 30 forms an outer skin of a body part for motor vehicle, in this case a bonnet. The thickness of the part 30 is less than 3 mm. The compositions of examples A and C can be used to manufacture such a part. The same applies for compositions E and G. The parts manufactured using the latter compositions comply with the specifications imposed for parts of virgin material. However, with the compositions of examples B, D, F and H, it was not possible to manufacture parts complying with these specifications.

The invention is not limited to the embodiments described and other embodiments will be clearly apparent to those skilled in the art.

Thus, the composition can be manufactured using a device other than an extrusion device or a plasticating screw or with the components incorporated in a different order.

When the method is carried out in two separate steps, the two steps can be performed in a different mixer.

Parts other than body parts for motor vehicle and even parts for sectors other than the automotive industry can also be manufactured.

The product containing mostly polypropylene may contain a polymer other than polyethylene.

The polymer grafted with maleic anhydride is not limited to SEBS but may be another polymer such as polypropylene.

The invention claimed is:

1. Method for manufacturing a composition, comprising bringing into contact the following three components:

a product containing mostly polypropylene having a controlled fluidity according to standard ISO 1133 (230° C., 2.16 kg) less than 10 g/10 min, present in an amount from 82% to 88% inclusive, by total weight of the composition, polypropylene having a controlled fluidity according to standard ISO 1133 (230° C., 2.16 kg) greater than 400 g/10 min, present in an amount from 7% to 13% inclusive, by total weight of the composition, and a polymer grafted with maleic anhydride, present in an amount from 2% to 8% inclusive, by total weight of the composition.

2. Method according to claim 1, said method further comprising two steps, performed in this order:

bringing into contact the product containing mostly polypropylene and the polypropylene having a controlled fluidity according to standard ISO 1133 (230° C., 2.16 kg) greater than 400 g/10 min, and adding the polymer grafted with maleic anhydride.

3. Method according to claim 1, wherein the product containing mostly polypropylene and the polypropylene having a controlled fluidity according to standard ISO 1133 (230° C., 2.16 kg) greater than 400 g/10 min are brought into contact so as to obtain a first mixture and the polymer grafted with maleic anhydride is added in a second stage to this first mixture.

4. Method according to claim 1, wherein the polymer grafted with maleic anhydride is Styrene Ethylene Butadiene Styrene (SEBS).

5. Method according to claim 1, wherein the components are brought into contact in an extruder.

6. Method according to claim 1, wherein the components are brought into contact in a plasticating screw.

7. Method according to claim 1, wherein the product containing mostly polypropylene contains between 5% and 10% inclusive of polyethylene, by total weight of said product.

8. Method according to claim 1, wherein the product containing mostly polypropylene is obtained at least partly from recycling.

* * * * *